B. TULLY.
POWER TRANSMITTING DEVICE FOR AUTOMOBILES.
APPLICATION FILED NOV. 17, 1910.
995,641.
Patented June 20, 1911.
2 SHEETS—SHEET 1.
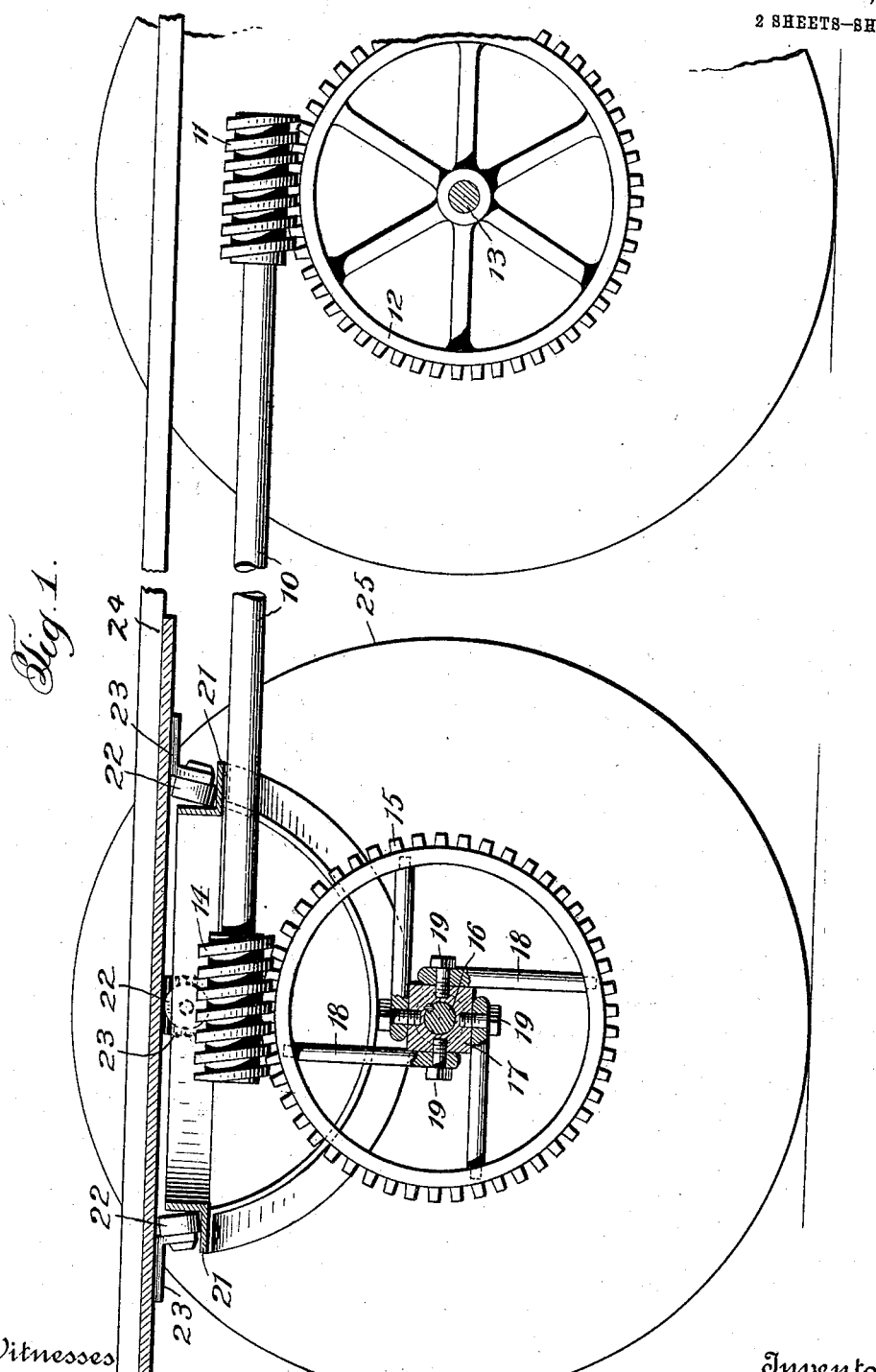

B. TULLY.
POWER TRANSMITTING DEVICE FOR AUTOMOBILES.
APPLICATION FILED NOV. 17, 1910.
995,641.
Patented June 20, 1911.
2 SHEETS—SHEET 2.
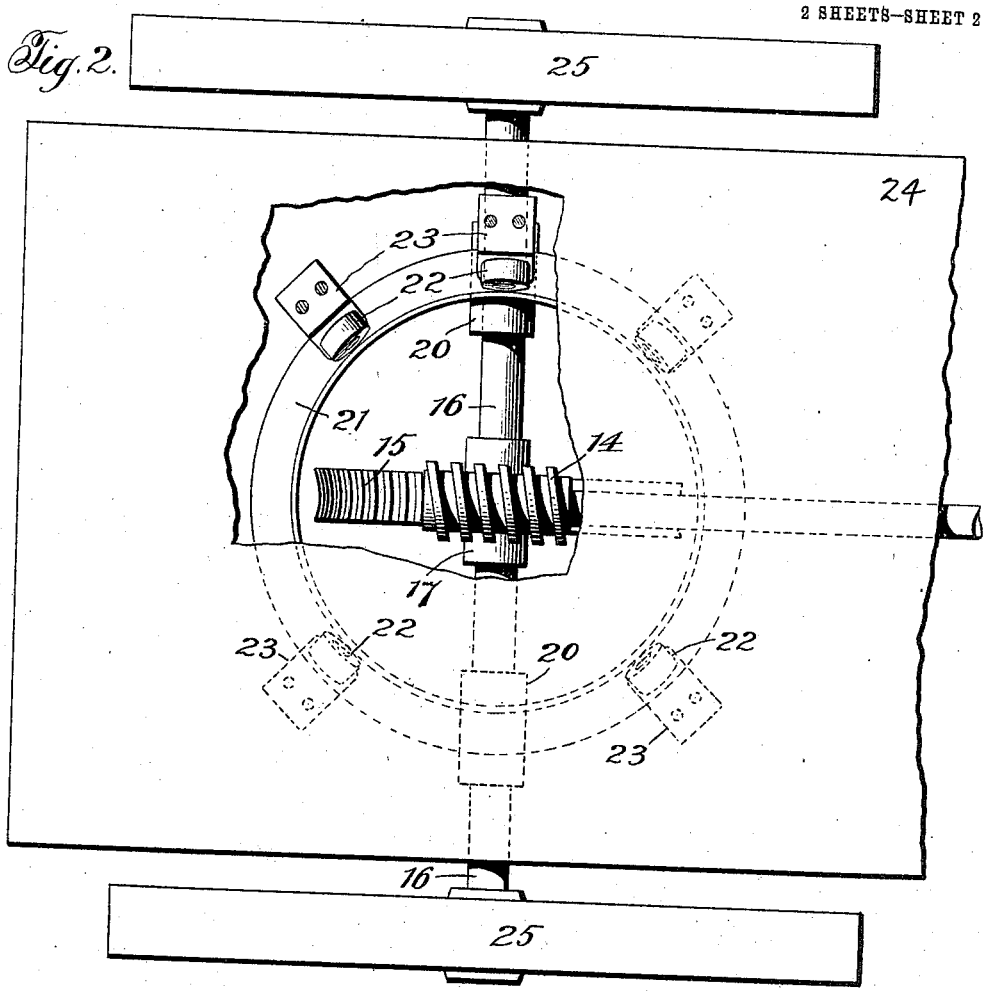
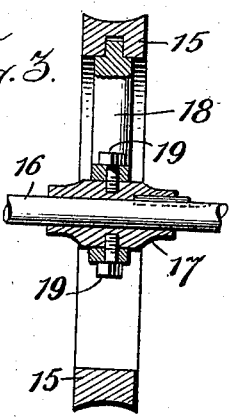
Witnesses:
Jas. E. Hutchinson
Agnes T. Hayes
Inventor:
Bernard Tully
By Chas. J. Williamson
Attorney

UNITED STATES PATENT OFFICE.

BERNARD TULLY, OF TIFFIN, OHIO.

POWER-TRANSMITTING DEVICE FOR AUTOMOBILES.

995,641.  Specification of Letters Patent.  Patented June 20, 1911.

Application filed November 17, 1910. Serial No. 592,905.

*To all whom it may concern:*

Be it known that I, BERNARD TULLY, of Tiffin, in the county of Seneca and in the State of Ohio, have invented a certain new and useful Improvement in Power Transmitting Devices for Automobiles, and do hereby declare that the following is a full, clear, and exact description thereof.

My invention relates to power transmitting devices designed more especially for driving the front or steering axle of automobiles, and the object of my invention is to provide a less expensive and more efficient device for this purpose, and for the attainment of the object of my invention said invention consists in the device constructed substantially as hereinafter specified and claimed.

Referring to the accompanying drawings—Figure 1 is a longitudinal section of enough of an automobile to illustrate an embodiment of my invention; Fig. 2 is a top plan view of the front axle and its appurtenant parts; and Fig. 3 a horizontal section.

I have had particularly in view the adaptation of my invention to plow vehicles and other motor driven farm implements and in the embodiment of my invention which I have selected as an illustration thereof, there is a motor driven shaft 10 running longitudinally of the vehicle and geared to both the front and the rear axles for the transmission of power to both said axles. The gear connection between the shaft 10 and the rear axle includes a worm 11 meshing with a worm wheel 12 keyed to the rear axle 13 while the gear connection with the shaft 10 and the front axle, which is the steering axle, consists of a worm 14 on the shaft that meshes with a worm wheel 15 having a loose or swiveled connection with the front axle 16, presently described, whereby the front axle may swing or oscillate for steering purposes independently of the worm wheel 15. Of course the loose or flexible connection between the worm wheel and the axle may be employed in the case of the rear axle 13 should it be desired.

The worm wheel 15 has a hub 17 through which the axle passes and to which it is rigidly keyed or otherwise secured, and said hub is preferably polygonal or flat sided in cross section and from the flat sides thereof spokes 18 extend to the rim of the wheel 15, each spoke 18 being pivotally connected, as by means of a screw or bolt 19 with the hub side, so that the spoke may swing in a plane parallel with the longitudinal axis of the axle, and each spoke at its outer end has a pivoted or swiveled connection with the wheel rim which allows the wheel hub, together with its axle to swing so as to provide for the accommodation of the position of the parts required by the swinging of the axle. It will be observed that the spokes extend from the hub tangentially so that they are not radial to the axle axis. As a result of this arrangement of the spokes there is no shortening or drawing of the spokes out of the wheel rim sockets in a turning movement and the hub can be a large substantial body.

The front axle 16 passes through boxes or bearings 20 on opposite sides of the wheel 15, which boxes 20 are at the lower ends of the arms to the upper end of which a fifth wheel 21 is riveted or bolted and adapted to travel on the fifth wheel is a series of rollers 22 each attached to a bracket 23 fastened to the underside of the floor 24 the vehicle body. Carrying wheels 25 are shown on each axle.

Having thus described my invention what I claim is—

1. The combination with a vehicle axle, a power shaft, and gearing between the power shaft and the axle, comprising a wheel rim, a hub secured to the axle, and spokes extending from the hub tangentially to the rim, a pivotal connection between the inner ends of said spokes and the hub and a pivotal connection between the outer ends of the spokes and the rim.

2. The combination with a vehicle axle, a power shaft, gearing between the power shaft and the axle, comprising a wheel rim, a hub secured to the axle, and spokes extending from the hub tangentially to the rim, a pivotal connection between the inner ends of said spokes and the hub and a pivotal connection between the outer ends of the spokes and the rim; a fifth wheel comprising a track, and a support for said track extending from the axle on each side of said wheel rim.

In testimony that I claim the foregoing I have hereunto set my hand.

BERNARD TULLY.

Witnesses:
　NORMAN W. PETERS,
　RUSHTON D. NILES.

Copies of this patent may be obtained for five cents each, by addressing the "Commissioner of Patents, Washington, D. C."